March 6, 1973     W. S. BRUCKER     3,718,958

ROTARY CUTTING TOOL

Filed May 7, 1971

WILLIAM S. BRUCKER
INVENTOR.

BY
John F. McClellan Sr.
Atty.

United States Patent Office 3,718,958
Patented Mar. 6, 1973

3,718,958
ROTARY CUTTING TOOL
William S. Brucker, 1500 Providence Road,
Towson, Md. 21204
Filed May 7, 1971, Ser. No. 141,236
Int. Cl. B23d 71/00; B26d 1/12
U.S. Cl. 29—103 R      6 Claims

ABSTRACT OF THE DISCLOSURE

A rotary cutting tool for producing bevelled or otherwise molded edges on furniture and the like, comprising a unitary shank-mounted peripheral-cutter having fixed conical guides at each end sloped to form between them an included angle of 90°; both assembled and one-piece embodiments are disclosed.

---

This invention relates generally to material working devices and specifically to rotary side-cutting tools.

Side cutting rotary milling cutters have long been known and used in power tools in the woodworking and metal working arts.

However, even though the portable electric drill is the most widely owned and used of all power tools, side cutting milling tools are rarely used in portable electric drills because of the difficulty in controlling cuts.

This is particularly unfortunate in that, as a consequence, custom shelving and other edged furniture, framing, and the like, even though usually made using portable electric drills at some stage, is usually not finished-out with molded edges. The sharp edges left can be safety hazards and impart a crude appearance to even the most carefully constructed work.

It is a primary object of the present invention to provide self-guiding rotary molding cutters which are preferably controllable in making molding cuts with power hand-tools as well as with stand mounted machines.

Another object of the invention is to provide cutting tools as described which have integral cutting guides so disposed that guide looseness is eliminated, guide wear is minimized and the same high precision of cut is assured throughout the life of the tool.

A further object of the invention is to provide cutting tools having integral guides which in embodiments, are either of metal or are non-metallic as may be desired for particular applications. Yet a further object is to provide a rotary side-cutter with integral conical guides forming between them at the cutting surface a finished-work angle or guidance angle for the cutter of 90°, thereby enabling the tool to stabilize itself precisely on right-angle corner surfaces while cutting and to fair-in interrupted and reverse-direction molding cuts.

Other objects are to provide a cutting tool as described in which the guides are non-marring to the surfaces guided on, but which are adapted to brush away and cast off chips and other detritus in the path and on the guides rather than rolling over them and causing irregularities in the cut; to provide a cutting tool as described which is extremely economical to manufacture, which is durable and reliable in use, which is readily adaptable to the various size and shape embodiments required for different moldings, which is impossible to attach incorrectly to the driving power-tool, which is fast-cutting but safe in operation, and which is attractive in appearance.

In accordance with these objects, the invention comprises a shank mounted side cutter with a conical guide at each end of the cutter forming a predetermined work guidance angle between the guides, the whole being either of one-piece construction or fixed composite assembly.

Figure 1:
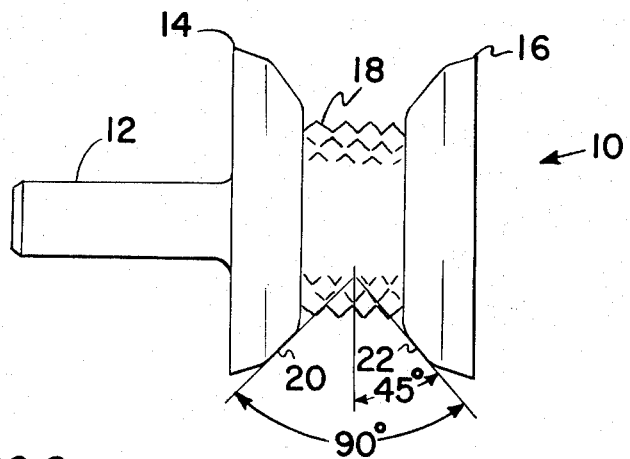
Figure 2:
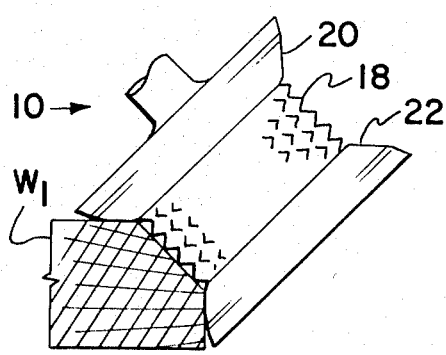
Figure 3:
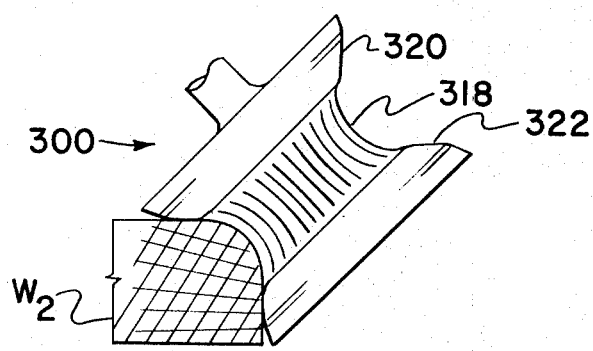
Figure 4:
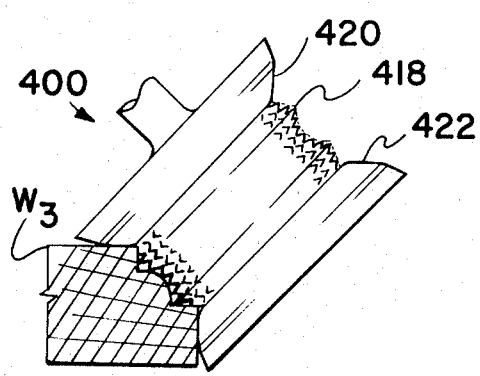
Figure 5:
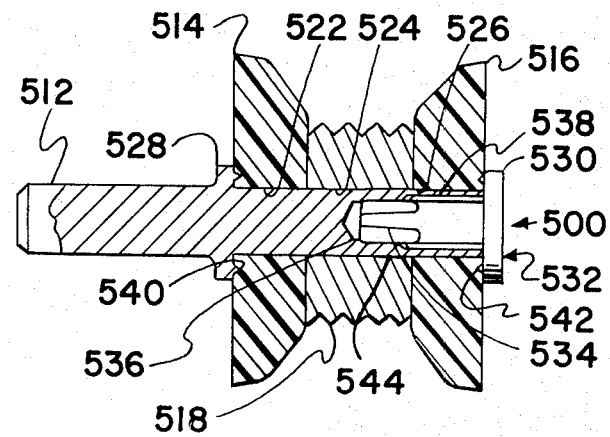

The above and other advantages and objects of the invention will become more readily understood on examination of the following description with reference to the drawings, in which:

FIG. 1 is a view of the length of a cutting tool;
FIGS. 2–4 are end views of molded edges being formed by cutting tools according to this invention; and
FIG. 5 is a longitudinal section of a cutting tool assembly.

In the figures, similar reference numerals denote similar parts.

Referring to FIG. 1 in detail, the embodiment 10 shown is formed of a single piece which may be tool steel, carbon steel, or other suitable material suitably tempered. Shank 12 is adapted for being gripped in the chuck of any common rotary power tool, particularly a portable drill of any convenient size. Frustro-conical guides 14, 16 are provided on either end of the cutting surface 18. The conical guides preferably have included cone-angles of 90° forming between them the work guidance angle of 90°, which is symmetrical about a radius of the tool. The importance of these preferred angles and the preferred symmetrical disposition will become apparent in later figures. As shown, the working surface on each cone guide is gently faired inward at the frustrum and outward at the base of the cone to prevent marring of work guided on.

The peripheral cutting surface 18 of the tool is toothed. The teeth may be, as shown, in the form of positively raked serrations arrayed in rows parallel with the axis of the tool, with the serrations in each row randomly staggered with respect to those in the other rows. Alternatively, each row may comprise a single continuous cutting edge, or any suitable arrangement may be used.

FIGS. 2, 3 and 4 illustrate respectively the FIG. 1 embodiment and other shape embodiments of the FIG. 1 cutting tool in operation forming moldings on wooden workpieces, shown here in end view, except that FIG. 3 shows continuous cutting edges.

In each of these figures, the tool of this invention is making a precise, one-pass, full-depth finish cut, which capability is characteristic of the design when used to finish most woods. In each case the conical guides 20, 22, 320, 322, 420, 422 are shown fully receiving and guiding on the right-angled plane surfaces on the workpieces.

Cutter 18 of embodiment 10 is cylindrical, and consequently forms a flat 45° bevel bounded by the sides of the workpiece, as shown, in the work $W_1$.

Cutter 318 of embodiment 300 is concave and forms a rounded convex molding bead bounded by the sides of the workpiece in work $W_2$.

Cutter 418 of embodiment 400 is conically convex at the ends with a concavity between, and forms a convex molding bead bounded by molding planes, in workpiece $W_3$.

In very hard material, such as metal, it is preferable to make a first pass with a flat-bevel tool like that of FIG. 1 followed by a tool with the molding shape desired, which may be any of those shown, or others to taste.

In every case a very smooth and pleasing molding results.

As with other tools, in cross grain work the tool is advanced inward from the edges of the work to prevent splintering and the cuts are faired together when they meet. The spindle is reversed as necessary to insure that cutter rotation is into the edge of the cross grain rather than away from the edge. This operation requires great accuracy in hand-held power tool work. The slightest looseness, slippage, or lack of control will show as a cut discontinuity and can easily ruin the appearance of the work.

Three provisions of the present invention are especially important in assuring a clean smooth fairing-in every time in cross-grain or other type work where cuts must meet, leaving no trace of interruption. First, the symmetrical 90° angle between the guide cones allows the spindle to be reversed after a partial pass while preserving the exact guidance used on the partial pass. Second, the integral cutting tool is absolutely free of play and erratic motion since there are no relatively moving parts to wear loose, or to jam and surge during cutting. The shank, guides, and cutters all spin together and provide a reliably controllable cut. Lastly, rotation of the guide cones tends to clear away chips, sawdust, and other material which could otherwise deflect the guide cones and disturb the cut by clinging to the guide cones or to the surfaces of the work in the path of the guide cones.

Although the one-piece construction described in reference to FIG. 1 has the many advantages indicated, for some applications, and for manufacturing economy, a composite assembly of fixed parts is preferable. For example, it may be desirable to use non-metallic guides or other special guides when working exceptionally delicate surfaces.

FIG. 5 shows at 500 such a composite assembly. The shank 512 extends through central perforations 522, 524, 526 in the guide cone 514, the cutter 518, and the guide cone 516, respectively, stopping just short of extending flush with the base of guide cone 516.

The guides and cutter are axially constained between a step or shoulder 528 on the shank and the head 530 of a fastener 532 which engages the terminal portion or free end of the shank.

Various means of holding the assembly together and preventing relative rotation may be used.

The FIG. 5 arrangement is practical, secure, economical, and takes account of special requirements imposed by the use of non-metallic guides, which may be relatively brittle, as when made of phenolic plastic, for example.

Fastener 532 is a rivet having flutes 534 extending from the end partway back toward the head 530. The free end of the shank 512 is drilled at 536 to receive the fastener fluted portion in a heavy-press fit. The drilled hole 536 is counterbored at 538 to provide clearance for the remainder of the fastener body.

On assembly, the shank 512 is inserted in guide cone 514, cutter 518, and guide cone 516, and the fastener 532 is pressed home in the shank until the head 530 of the fastener is stopped against the base of guide cone 516. This single press securely unites all parts of the assembly and prevents relative rotation, as will be seen from the following.

Sharp protrusions 540 on the working face of shoulder 528 engage the base of guide cone 514 by piercing matching pits in the guide cone if it is of plastic or otherwise softer than the protrusions. If necessary, pits are provided in the guide cone for the purpose. Conversely here, as at other locations, the protrusions and pits can be interchanged.

Sharp protrusions 542 from the head of the fastener likewise engage the base of the other guide cone 516. The flutes 534 on the body of the fastener heavily engage the relatively thin wall of the shaft and expand it radially as exaggeratedly diagrammed at 544, locking the fastener and the cutter 518 to the shaft.

Counterbore 538 is larger than the body diameter of the fastener and protects the guide cone 516 from radial pressure which might cause cracking in the bore 526 of the guide cone if it is of brittle material.

Of course other means of locking the parts together can be used, as appropriate, such as providing protrusions and pits between cutter and guide cone, welding, etc.

From the foregoing it can be seen that fixed-composite embodiments of the invention which preserve the essential nature of the invention are easily made, and provide advantages not otherwise available. For example, in addition to those mentioned, the cutter surface is more accessible during manufacture, and being separate, does not require that the entire assembly be made of cutter material, or be tempered with the cutter.

Obviously many mondifications and variations of the present invention are possible in light of the above teachings. It is, therefore, to be understood that within the scope of the appended claims the invention may be practiced otherwise than as specifically described.

What is claimed and desired to be secured by United States Letters Patent is:

1. A cutting tool comprising: a shank including a substantially constant diameter length adapted for gripping, a stepped portion axially adjacent said length, a mounting portion axially adjacent the stepped portion, with a fastening portion terminally proximate the mounting portion; centrally perforated means for cutting including a peripheral surface co-axially fixed on the mounting portion of the shank; centrally perforated circular guide means of material relatively softer than said cutting surface, said circular guide means positioned on the mounting portion of the shank axially at each end of said means for cutting; and a fastener integrally securing the circular guide means and the means for cutting between the stepped portion of the shank and the fastener, axially interlocking said guide means with said stepped portion of the shank and said fastener respectively; a portion of said fastener being adapted to enter the end of the mounting portion of the shank on assembly and being sized to expand radially a portion of the shank within the cutting means central perforation, thereby fixing the cutting means to the shank.

2. A cutting tool as recited in claim 1, wherein the circular guide means are generally frustro-conical in shape, with the frustrum of each cone proximate a respective end of said cutting means.

3. A cutting tool as recited in claim 1, wherein the circular guide means are generally frustro-conical in shape, with the frustrum of each cone proximate a respective end of said cutting means.

4. A cutting tool as recited in claim 2, wherein the frustrum diameters are substantially equal, and wherein the respective ends of the cutting means have diameters approximating the frustrum diameters.

5. A cutting tool as recited in claim 2, wherein the respective included angles of said cones are substantially 90°, thereby providing between them at the cutter a work guidance angle of substantially 90°.

6. A cutting tool comprising: a shank, including a substantially constant diameter length adapted for gripping, a stepped portion axially adjacent said length, a mounting portion axially adjacent the stepped portion, with a fastening portion terminally proximate the mounting portion; centrally perforated means for cutting, including a peripheral surface co-axially fixed on the mounting portion of the shank; centrally perforated circular guide means of material relatively softer than said cutting surface, said circular guide means positioned on the mounting portion of the shank axially at each end of said means for cutting; and a fastener integrally securing the circular guide means and the means for cutting between the stepped portion of the shank and the fastener.

References Cited

UNITED STATES PATENTS

| | | | |
|---|---|---|---|
| 1,630,173 | 5/1927 | Dumont | 144—218 |
| 1,433,497 | 10/1922 | Carter | 144—134 D |
| 3,121,939 | 2/1964 | Williams | 29—96 |
| 2,861,323 | 11/1958 | Ebel | 29—103 |
| 3,289,716 | 12/1966 | Dutot | 144—134 D |
| 2,589,458 | 3/1952 | Toussaint | 144—134 D |
| 331,771 | 12/1885 | Corson | 144—236 X |

HARRISON L. HINSON, Primary Examiner

U.S. Cl. X.R.

29—78 R, 79 R; 144—218 R, 134 D